United States Patent
Kotha et al.

(10) Patent No.: US 6,219,040 B1
(45) Date of Patent: Apr. 17, 2001

(54) CRT TO FPD CONVERSION/PROTECTION APPARATUS AND METHOD

(75) Inventors: Sridhar Kotha, Fremont; Rakish K. Blindish, San Jose, both of CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/412,320

(22) Filed: Oct. 5, 1999

Related U.S. Application Data

(62) Division of application No. 08/909,251, filed on Aug. 11, 1997, now Pat. No. 6,115,032.

(51) Int. Cl.$^7$ .................................................. G09G 5/00
(52) U.S. Cl. .............................................. 345/211; 345/3
(58) Field of Search ...................................... 345/211, 212, 345/213, 3, 87, 99

(56) References Cited

U.S. PATENT DOCUMENTS

| | | | | |
|---|---|---|---|---|
| 4,827,347 | * | 5/1989 | Bell ........................................ | 358/224 |
| 4,845,482 | * | 7/1989 | Howard et al. ...................... | 340/805 |
| 5,150,109 | * | 9/1992 | Berry .................................... | 340/811 |
| 5,179,345 | * | 1/1993 | Jenkins et al. ....................... | 324/678 |
| 5,222,212 | * | 6/1993 | Johary et al. ........................ | 395/162 |
| 5,226,933 | * | 7/1993 | Frank et al. ......................... | 345/141 |
| 5,233,331 | * | 8/1993 | Comerford et al. ................. | 340/712 |
| 5,247,286 | * | 9/1993 | Ishikawa .................................. | 345/3 |
| 5,254,982 | * | 10/1993 | Feigenblatt et al. ................. | 345/148 |
| 5,270,687 | * | 12/1993 | Killebrew, Jr. ...................... | 345/150 |
| 5,285,192 | * | 2/1994 | Johary et al. ............................. | 345/3 |
| 5,287,100 | * | 2/1994 | Guttag et al. ........................ | 345/213 |
| 5,293,468 | * | 3/1994 | Nye et al. ............................. | 395/131 |
| 5,302,985 | * | 4/1994 | Kennedy et al. .................... | 353/122 |
| 5,309,551 | * | 5/1994 | Guttag et al. ........................ | 395/131 |
| 5,327,159 | * | 7/1994 | Van Aken et al. ................... | 345/153 |
| 5,341,470 | * | 8/1994 | Simpson et al. ..................... | 395/164 |
| 5,400,057 | * | 3/1995 | Yin ....................................... | 345/199 |
| 5,436,636 | * | 7/1995 | Nonoshita et al. .................. | 345/100 |
| 5,508,714 | * | 4/1996 | Zenda ...................................... | 345/3 |
| 5,534,883 | * | 7/1996 | Koh ........................................ | 345/3 |
| 5,559,525 | * | 9/1996 | Zenda ...................................... | 345/1 |
| 5,579,025 | * | 11/1996 | Itoh ........................................ | 345/3 |
| 5,608,418 | * | 3/1997 | McNally ................................. | 345/3 |
| 5,703,629 | * | 12/1997 | Mermelstein et al. ............... | 345/213 |
| 5,742,261 | * | 4/1998 | Yuki et al. .............................. | 345/3 |
| 5,757,365 | * | 5/1998 | Ho ....................................... | 345/212 |

OTHER PUBLICATIONS

Cirrus Logic Advance Hardware Reference Manual, Version 1.1, pp. 12–178 through 12–179, Jun. 1996.*

* cited by examiner

*Primary Examiner*—Regina Liang
(74) *Attorney, Agent, or Firm*—Robert P. Bell; Peter Rutkowski

(57) ABSTRACT

The present invention allows a single display controller design to be used in multiple markets by providing an additional stand-alone circuit which converts conventional analog CRT display signals to digital flat panel display or other digital display signals. A single VGA CRT controller may be implemented in both desktop and portable (e.g., laptop) markets thereby reducing the cost of the display controller through the economies of scale. For a laptop or other digital display markets, the apparatus of the present invention may be applied to a conventional analog CRT controller to convert analog CRT signals to digital laptop signals to generate a display on a flat panel display or other digital device. In addition, the apparatus of the present invention may be incorporated into a stand-alone flat panel display intended for use as a replacement for conventional CRT monitors. The apparatus of the present invention accepts a conventional analog CRT input and outputs digital flat panel display signals. When packaged with a flat panel display intended for the desktop PC market, the present invention provides an overall apparatus which is plug-in compatible with prior art analog VGA controllers. The apparatus of the present invention may also incorporate flat panel protection circuitry to prevent damage to a flat panel display during testing or the like. In addition, the present invention further encompasses an apparatus for providing flat panel protection in a stand-alone circuit.

8 Claims, 6 Drawing Sheets

CRT TO FPD CONVERSION/PROTECTION APPARATUS AND METHOD

CROSS-REFERENCE TO RELATED APPLICATIONS

This application is a Divisional application of U.S. patent application Ser. No. 08/909,251, filed Aug. 11, 1997, now U.S. Pat. No. 6,115,032, and incorporated herein by reference.

The subject matter of this application is related to that in co-pending U.S. application Ser. No. 08/704,842, filed Aug. 28, 1996, entitled "METHOD AND APPARATUS FOR PROVIDING LCD PANEL PROTECTION IN AN LCD DISPLAY CONTROLLER", incorporated herein by reference.

FIELD OF THE INVENTION

The present invention is related to display controllers for computer systems, particularly for flat panel displays and the like.

BACKGROUND OF THE INVENTION

Prior art computer systems are generally provided with one of two types of displays; Cathode-Ray Tube (CRT) or Flat Panel Display (FPD). CRT displays generally require an analog input comprising analog signals indicating the intensity of Red, Blue, and Green (RGB) components as well as horizontal and vertical synchronization signals.

FPDs generally operate using one of two technologies. So-called passive matrix (e.g., Dual-Scan Super-Twist Neumatic, or DSTN) displays comprise a grid of horizontally and vertically oriented conductors on opposite sides of a liquid crystal matrix. When current is applied to corresponding conductors, a corresponding liquid crystal portion is activated, generating a display pixel.

So-called active-matrix displays comprise a plurality of transistors formed in a grid, one for each color of a given pixel int he display. When each transistor is activated, a liquid crystal portion corresponding to a color of a pixel is activated. In both active- and passive-matrix FPDs, generally digital signals are used to activate each pixel within the display. Variations in shading and color are generally achieved through the use of timing or dithering techniques and the like.

In the prior art, separate video controller devices may be used to generate signals for FPDs or CRTs. Video controllers dedicated to CRT use are generally applied to the desktop personal computer (PC) market which generally uses the higher resolution and less expensive CRT as a display device. Dedicated FPD display controllers are generally designed for the portable or laptop computer market for generating digital signals for compact, energy-saving flat panel displays.

For many portable or lap-top computers, an analog output is desirable for connecting a portable or laptop computer to an analog CRT display, in docking use or for display presentations or the like. An FPD display controller may be suitably modified by adding an digital to analog converter (DAC) to provide an analog output for a CRT display device.

FIG. 1 is a block diagram illustrating a prior art VGA controller for use with a laptop computer or other portable computer display device. VGA controller 100 may be coupled to a host processor (not shown) through system bus 190. For the purposes of this application, the term "VGA" (video graphics array or adapter) shall be construed to include VGA, SVGA, and other expanded or modified VGA controllers or other devices. It should also be appreciated that the present invention is not limited to the use of VGA controllers, but may be applied to other types of systems (e.g., MacIntosh® PCs, television displays, and the like).

System bus 190 may comprise any one of a number of known system buses, such as the Industry Standards Association (ISA) bus, Peripheral Component Interconnect (PCI), or Advanced Graphics Port (AGP), or the like. VGA core circuitry 120 receives display data from host processor (not shown) and stores such display data in display 170. VGA core circuitry 120 comprises conventional VGA core circuitry as is known in the art. VGA core circuitry may further comprise additional circuitry such as 2-D and 3-D graphics engines, MotionVideo™ processing circuitry, and the like.

Flat panel display controller 140 retrieves display data from display memory 170 and generates digital signals to flat panel display 160. Such digital signals include digital data for each pixel within flat panel display 160 indicating whether that pixel is to be turned on or off at a given point in time. Digital signals from flat panel display controller 140 to flat panel display 160 also include flat panel clocking and control signals.

If provided with an analog output, video controller 100 may also be equipped with RAMDAC 130. RAMDAC 130 comprises a color look-up table or CLUT (the RAM portion of RAMDAC 130) for color converting data from display memory 170. Flat panel display controller 140 may be equipped with a similar look-up table or may operate form the same look-up table within RAMDAC 130. RAMDAC 130 also includes a Digital-to-Analog Converter (DAC) for generating analog output signals from data the CLUT within RAMDAC 130 or directly from data within display memory 170.

Analog output signals R, G, and B indicate the intensity of respective red, green, and blue sub-pixels for each pixel on CRT display 150 and are timed correspondingly for each pixel in a horizontal scan line. Timing information is also sent from VGA core logic 120 to CRT 150 in the form of horizontal sync information HSYNC, vertical sync information VSYNC, and pixel or dot clock information D_CLK. CRT 150 utilizes analog signals R, G, and B, as well as timing signals HSYNC, VSYNC, and D_CLK to generate a display image using prior art electron gun technology.

The block diagram of FIG. 1 also illustrates the basic components of a prior art VGA controller for desktop use. However, a desktop VGA controller may not generally be provided with flat panel display controller 140, and digital output for flat panel display 160.

Thus, FPD controller 100 of FIG. 1 remains specific to the FPD market. In order to reduce costs for desktop units, such digital FPD controller circuitry may generally not be provided in a CRT-only controller. With the rising cost of computers, and computers becoming more commodity-like items, it becomes imperative that a display controller manufacturer realize economies of scale by providing a single design for as many markets as possible.

In addition, the analog CRT may, in coming years, become obsolete. There are already on the market flat panel displays for desktop use, intended to replace the conventional CRT display. However, such flat panel displays generally require the use of a specialized flat panel display controller card. Thus, a user wishing to upgrade a desktop PC to flat panel display technology may need to discard not only the CRT, but also the flat panel display controller as well.

In addition, new forms of digital CRTs may soon reach the market. For example, the long-awaited HDTV standard is being adopted, and a new generation of digital televisions will reach the market. Such digital televisions may be suitable for use with computer systems for generating displays. However, such digital televisions may require dedicated display interfaces in order to generate a display from a computer system.

In co-pending U.S. application Ser. No. 08/704,842, filed Aug. 28, 1996, entitled "METHOD AND APPARATUS FOR PROVIDING LCD PANEL PROTECTION IN AN LCD DISPLAY CONTROLLER", incorporated herein by reference, a display controller for a flat panel display is described with a circuit for protecting a flat panel display from damage. A flat panel display may be provided with a high-voltage power $V_{EE}$ and flat panel logic power $V_{DD}$. If $V_{EE}$ is applied to an FPD without $V_{DD}$, the flat panel display may be damaged.

Under normal circumstances, such an application of voltages may not ordinarily occur. However, during testing phases, or during flat panel power-up and power-down, if a hardware or software error occurs, it is possible that such voltages could be improperly applied, and a flat panel display damaged. A control circuit which monitors flat panel display signals and properly shuts down power to a flat panel display may prevent such damage. It may be desirable to provide such a flat panel display protection circuit as a stand-alone device to incorporate into a flat panel display or as an add-on device for a flat panel display controller or the like.

SUMMARY OF THE INVENTION

The present invention allows a single display controller design to be used in multiple markets by providing an additional stand-alone circuit which converts conventional analog CRT display signals to digital flat panel display or other digital display signals.

By providing such a circuit, a single VGA CRT controller may be implemented in both desktop and portable (e.g., laptop) markets thereby reducing the cost of the display controller through the economies of scale. For a laptop or other digital display markets, the apparatus of the present invention may be applied to a conventional analog CRT controller to convert analog CRT signals to digital laptop signals to generate a display on a flat panel display or other digital device.

In addition, the apparatus of the present invention may be incorporated into a stand-alone flat panel display intended for use as a replacement for conventional CRT monitors. The apparatus of the present invention accepts a conventional analog CRT input and outputs digital flat panel display signals. When packaged with a flat panel display intended for the desktop PC market, the present invention provides an overall apparatus which is plug-in compatible with prior art analog VGA controllers. The use of the apparatus of the present invention will make flat panel displays more readily accepted in the marketplace, as upgrading to such a display will not require replacement of expensive graphics controller hardware.

The apparatus of the present invention may also incorporate flat panel protection circuitry to prevent damage to a flat panel display during testing or the like. In addition, the present invention further encompasses an apparatus for providing flat panel protection in a stand-alone circuit.

BRIEF DESCRIPTIONS OF THE DRAWINGS

DETAILED DESCRIPTION OF THE INVENTION

Figure 1:
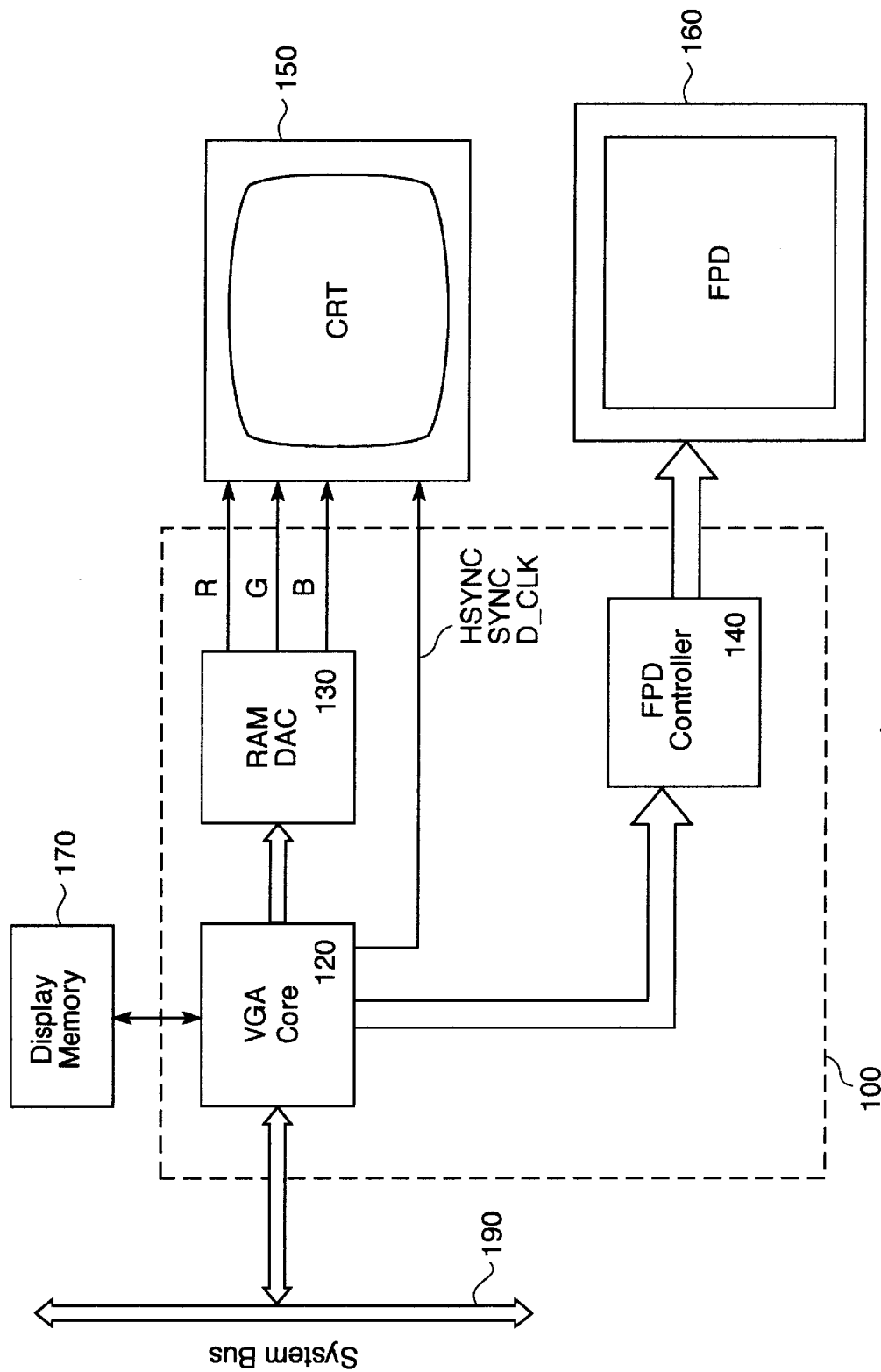
FIG. 1 is a block diagram of a prior art flat panel display controller with a CRT output.
Figure 2:
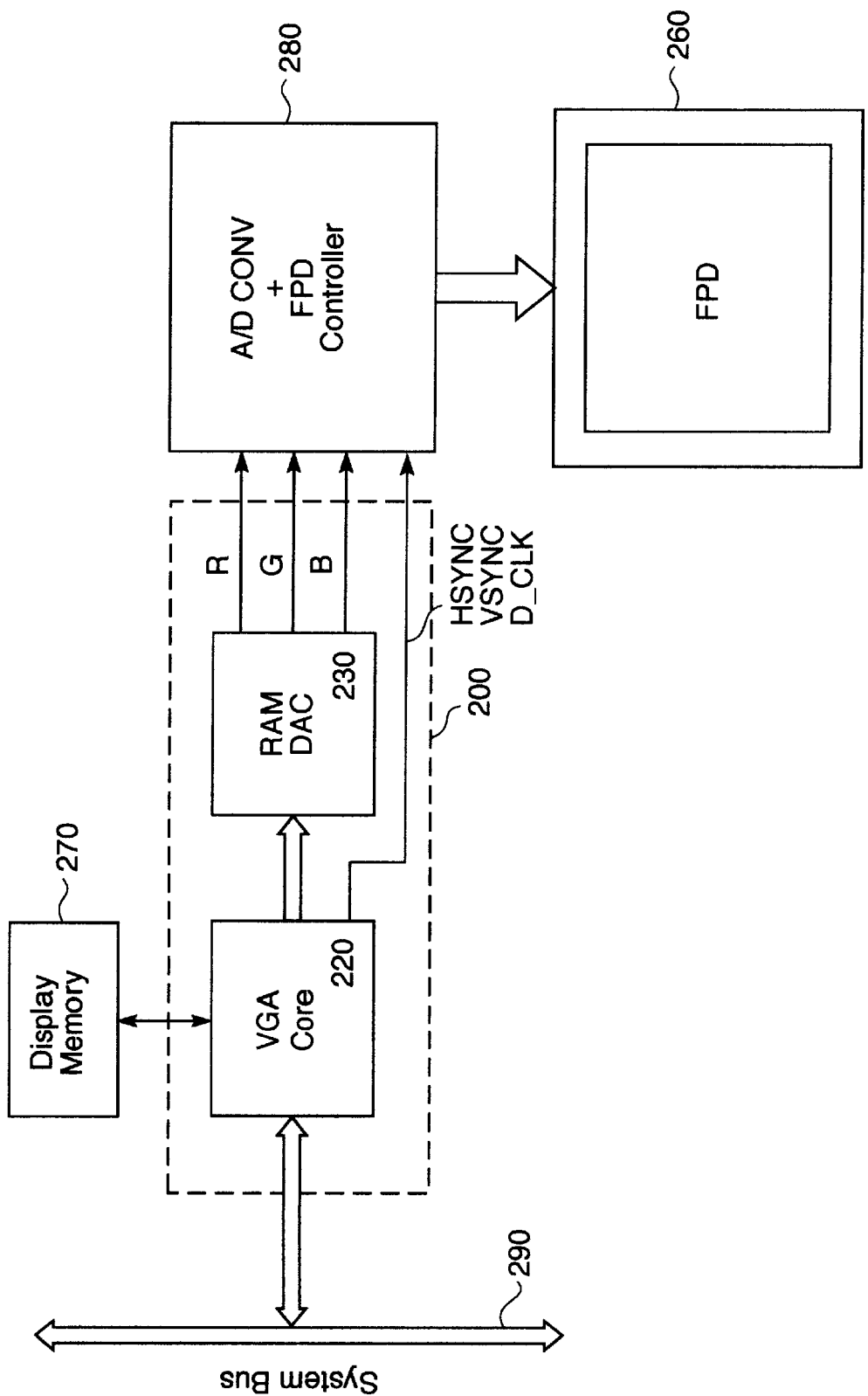
FIG. 2 is a block diagram illustrating the present invention used in conjunction with a prior art analog VGA controller and a flat panel display.

FIG. 2 is a block diagram illustrating the use of the apparatus of the present invention with a prior art analog CRT controller and flat panel display (FPD). In FIG. 2, a prior art analog VGA controller chip 200 is illustrated. Analog VGA controller chip 200 is similar to portable VGA controller chip 100 illustrated in FIG. 1, however flat panel display controller circuitry 140 is not implemented. The bulk of prior art VGA controller chips manufactured generally do not have flat panel display controller circuitry 140 incorporated therein if intended for the desktop market.

As in FIG. 1, analog VGA controller chip 200 receives data from a host processor (not shown) through system bus 290 and stores such data in display memory 270. VGA core logic 220 retrieves and operates on data stored in display memory 270 and outputs data to RAMDAC 230. As in the prior art FIG. 1, RAMDAC 230 color converts data from display memory 270 and converts such data to analog R, G, and B outputs. VGA core logic 220 also outputs timing signals HSYNC, VSYNC, and D_CLK.

In the prior art, such timing signals and R, G, and B outputs would intended for connection to an analog CRT 150 as illustrated in FIG. 1 though a standard 17-pin VGA cable. However, in the present invention, an A/D converter and flat panel controller 280 is connected to the R, G, and B analog outputs and timing signals HSYNC, VSYNC, and D_CLK from analog VGA controller 200. A/D converter and flat panel display 280 generates digital flat panel controller signals which are in turn output to flat panel display 260.

Thus, in the apparatus of FIG. 2, a conventional analog VGA controller chip may be implemented in a portable (e.g., laptop) without the need to modify VGA controller chip 200. The use of A/D converter and flat panel display controller 280 has many advantages. By providing a standard analog VGA controller chip in a portable environment, the economies of scale in manufacturing such a standard analog VGA controller chip may be realized.

Thus, although the present invention utilizes an additional device in the form of A/D converter and flat panel display controller 280, the overall cost may be less than that for a custom chip expressly made for the flat panel display market. In addition, the use of A/D converter and flat panel display controller 280 allows a portable computer designer more flexibility in selection of controller chips and allows high end graphics controller chips to more quickly reach the portable computer market.

In traditional display controller design, generally analog display controllers are first designed for the desktop market, and then such controllers are modified or redesigned for the portable market. High end graphics, animation, and video are generally implemented first in the desktop environment. Moreover, many display controller design groups are separated into separate analog desktop and portable display design sub-groups. Thus, the use of A/D converter and flat panel display controller 280 of the present invention allows high end graphics controllers to reach the portable market sooner, without the need for an expensive redesign or separate design staff. Moreover, the designer of a portable computer is no longer restrained to using a limited number of flat panel display controllers available in the marketplace, but may rather instead select from any controller for desktop or portable use.

It should be noted that in the present invention, digital display data is first converted into analog CRT signals, and then back into flat panel display data. Such an digital/analog/digital two-chip solution is rather non-intuitive to circuit designers and is one reason why the present invention has heretofore not been seen in the marketplace. It should also be noted that due to recent developments in power reduction circuitry (e.g., for the EnergyStar™ standard), analog VGA controller integrated circuits may incorporate many of the power saving features heretofore only seen in portable (e.g., flat panel controller) devices. Thus, the present invention may be successfully implemented in a portable computer device with a convention desktop analog VGA controller while still meeting portable computer power consumption design criteria.

Figure 3:
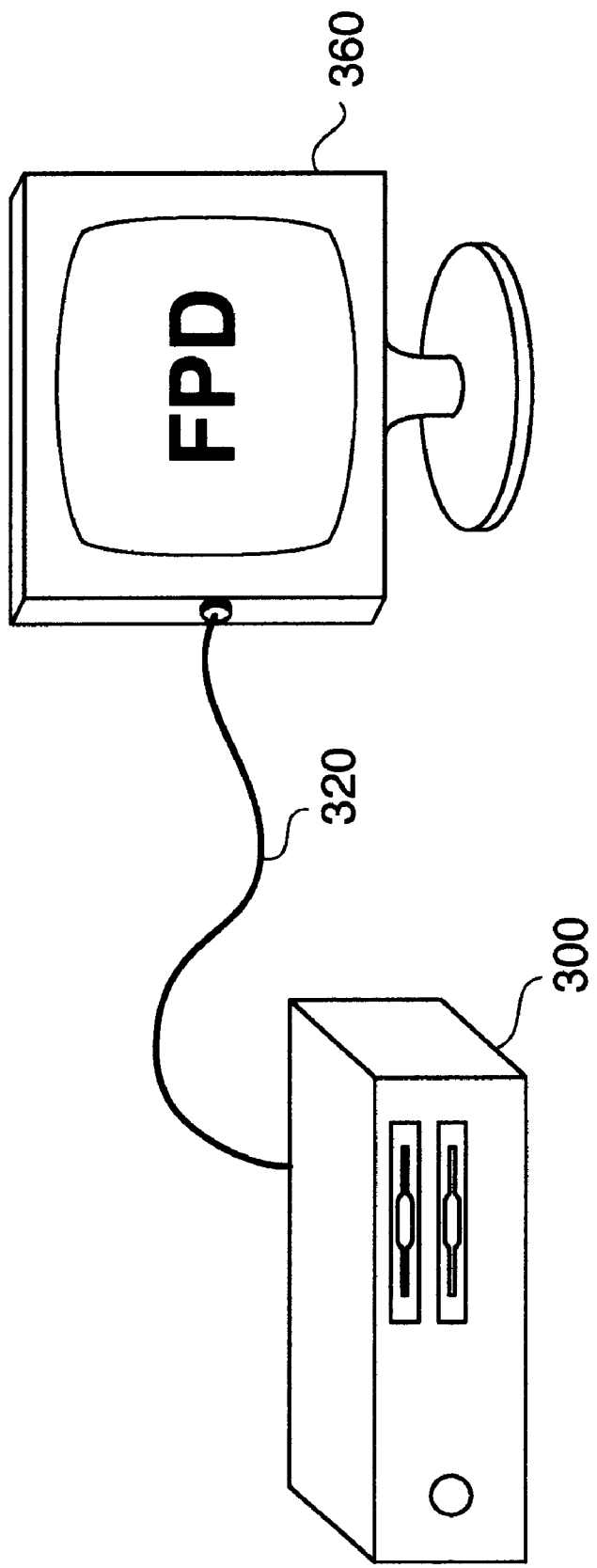
FIG. 3 is a drawing illustrating how a flat panel display me be used as a direct replacement for a CRT in the desktop PC market.

FIG. 3 is a drawing illustrating another application for the apparatus of the present invention. In FIG. 3, a stand-alone flat panel display 360 is provided as a pin-for-pin replacement for a conventional analog CRT. Desktop PC 300 is provided with a standard analog VGA controller such as analog VGA controller 200 of FIG. 2. Such a VGA controller outputs analog R, G, and B signals, as well as HSYNC, VSYNC, and D_CLK signals on a conventional 17-pin VGA connector.

Stand-alone flat panel display 360 may incorporate A/D converter and flat panel display controller 280 of the present invention. A/D converter and flat panel display controller 280 may be coupled to standard 17-pin VGA cable 320 to receive R, G, and B signals as well as HSYNC, VSYNC, and D_CLK timing signals.

The advantage of packaging A/D converter and flat panel display controller 280 within stand-alone flat panel display 360 are numerous. Acceptance of flat panel displays as direct replacement for CRTs in the desktop market has been met with some resistance for a number of reasons. Flat panel displays, particularly large, high resolution active-matrix (or new technology passive-matrix) displays are expensive to manufacture. However, manufacturing costs of such displays continues to drop, and it is widely accepted in the industry that such displays may eventually approach CRT prices.

However, as noted above, users may be reluctant to adopt a more expensive display if such a change also necessitates installing a new display controller card especially created for flat panel display use. Moreover, by using such a card, a user no longer may be readily able to switch to a conventional display for testing or upgrading purposes without also changing the display controller card. In addition, there may not initially be a coherent standard for connecting such a display so as to make such stand-alone displays 360 interchangeable with one another. By providing a "standard" 17-pin VGA input to stand-alone display 360 (alone or in combination with a proprietary or other display input), a manufacturer of stand-alone flat panel display 360 offers a user a product which is more flexible in use and less likely to be an "orphan" product.

Thus, in the drawing of FIG. 3, a user of desktop PC 300 may connect a stand-alone flat panel display 360 to desktop PC 300 using a standard 17-pin VGA cable 320 without the need to replace internal components (e.g., graphics card) within desktop PC 300.

Figure 4:
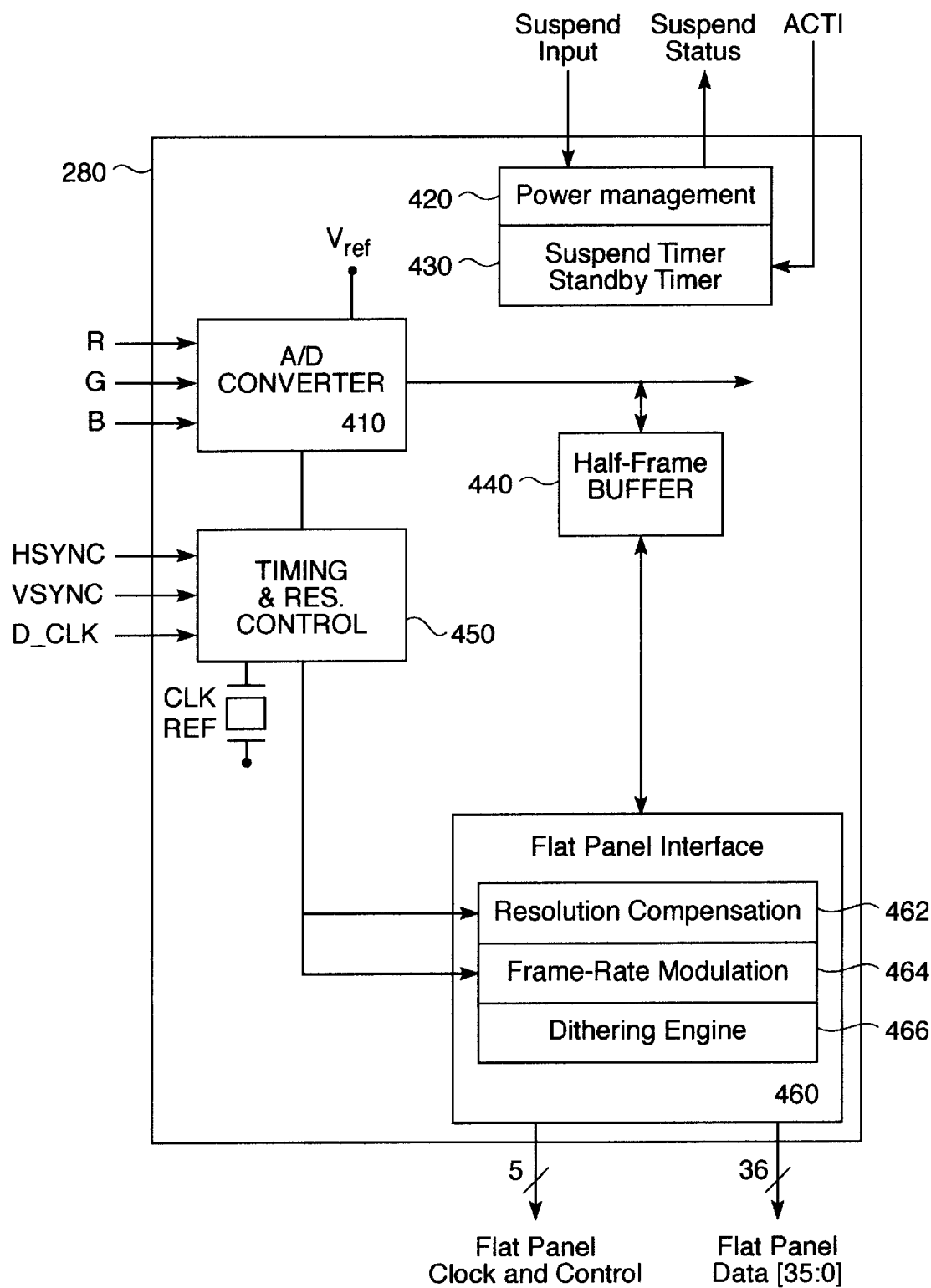
FIG. 4 is a block diagram of A/D converter and flat panel display controller 280 of the present invention.

FIG. 4 is a block diagram of A/D converter and flat panel display controller 280 of the present invention. A/D converter and flat panel display controller 280 may include A/D converter 410 which receives analog R, G, and B signals and converts such signals to digital values. A/D converter 410 may be supplied with voltage reference $V_{ref}$ in order to compare analog R, G, and B signals to a reference value. signal $V_{ref}$ may be a supply voltage, a voltage supplied by the analog VGA controller 200, or may be independently generated within A/D converter and flat panel display controller 280.

Analog CRT timing signals HSYNC, VSYNC and D_CLK may be fed to timing and resolution control 450. Timing and resolution control 450 may determine the native resolution of an analog CRT image signal being input to A/D converter and flat panel display controller 280. Clock reference CLK REF may be supplied such that timing and resolution control 450 can compare incoming clock signals HSYNC, VSYNC, and D_CLK with a known clock signal. Clock signal CLK REF may be internally generated within A/D converter and flat panel display controller 280, or may be externally generated.

By analyzing the frequency of VSYNC, refresh rate may be determined. The timing relationship between signals HSYNC and D_CLK (e.g., number of D_CLK pulses per HSYNC pulse) may determine horizontal resolution of an input analog CRT image signal. Similarly, the timing relationship between signals VSYNC and HSYNC (e.g., number of HSYNC pulses per VSYNC pulse) may determine vertical resolution of an input analog CRT image signal.

Once resolution and refresh rate of the incoming analog CRT image signal are known, such data may be fed to A/D converter 410 to control the timing of A/D conversion of incoming analog R, G, and B signals. Signal D_CLK, in particular, may be used to demarcate sampling periods for the analog voltage for each pixel. Input analog R,G, and B image signals may be converted into digital image data in a number of formats. For example, using eight bits per color sub-pixel, 24 bits per pixel (bpp) may be used. Other so-called "packed" pixel formats may also be used in order to reduce the complexity of circuitry. In general, the number of bits used to represent each pixel may be a function of native FPD color depth and desired color palette depth.

Pixel data output from A/D converter 410 may be fed to half-frame buffer 440. Half-frame buffer 440 may comprise an internal or external memory for storing pixel data. The overall size of half-frame buffer 440 may be varied depending upon the refresh rate of FPD 260, and the number of resolutions to be supported. Although illustrated here as a half-frame buffer 440, it may be appreciated by one of ordinary skill in the art that half-frame buffer 440 may actually comprise a full frame buffer or the like.

In addition, in a laptop embodiment, half-frame buffer 440 may be implemented within display memory 270 in order to reduce component count. In such an embodiment, however, care must be taken to insure memory access conflicts between analog VGA controller 200 and A/D converter and flat panel display controller 280 do not occur.

Flat panel interface 460 comprises a convention flat panel interface as is known in the art. Conventional flat panel display controllers such as the Cirrus Logic CL-GD7555 incorporate such a flat panel interface, and similar circuitry may comprise flat panel interface 460 within A/D converter and flat panel display controller 280. Flat panel interface 460 may retrieve digital display data from half-frame buffer 440 and output flat panel data and flat panel clock and control data as illustrated in FIG. 4.

Flat panel clock and control data may comprise clock signals LFS, LLCLK, and SCLK. Signal LFS is a clock signal indicating field timing for a display image. Signal LLCLK is a line clock signal for a display image, while SCLK is a pixel clock signal for a display image. Signals LFS, LLCLK, and SCLK are used by flat panel display 260 to control application of flat panel display data to appropriate pixels within the display. If one or more of signals LFS, LLCLK, and SCLK are improperly interrupted, damage may occur to flat panel display 260.

Flat panel displays such as FPD 260 generally have a fixed resolution, as each pixel has a corresponding physical element in the panel. Older flat panel displays may have a resolution of 640×480 pixels. Newer panels may have 800×600 pixels, 1024×768, or even 1280×1024. CRTs, in contrast, as analog devices, may generate images in a number of different resolutions. A typical modern CRT may display 320×240, 640×480, 800×600, 1024×768, and 1280×1024. Thus, flat panel interface 460 may need to compensate for the difference between the variable resolution of the analog image signal and the fixed resolution of flat panel display 260.

Such compensation may take several forms. For high resolution flat panel displays (e.g., 1024×768 and higher), lower resolution images may be displayed by "picture framing" or centering the image on the screen. Thus, a 640×480 image may be centered on a 1024×768 flat panel display. However, especially in lower resolutions used for gaming, such a technique may reduce the resultant image to an unacceptably small size.

Line and pixel replication and expansion techniques may be used to expand an image from a smaller resolution to a larger one. Similarly, input images of higher resolution may be reduced in size by digitally averaging, weighting, or filtering a number of adjacent lines or pixels together. Resolution compensation block 462 may perform such image expansion or compression (or centering) as is known in the art.

Similarly, frame rate modulation block 464 may compensate for differences in refresh rates between an input analog signal and the native refresh rate of flat panel display 260. Selected numbers of adjacent frames of data may be repeated or skipped in order to provide a proper refresh rate for flat panel display 260 regardless of the refresh rate of the analog input image signal.

Dithering engine 466 may be used to eliminate stair-step artifacts and other display artifacts which may be introduced in a digital display image. Again, such dithering engines are well known in the art and need not be explained here.

As illustrated in FIG. 4, A/D converter and flat panel display controller 280 may output 36 bits of flat panel data (e.g., 18 bits each for Red, Green, and Blue sub-pixels). Other numbers of bits may also be used as is known in the art. As is known in the art, flat panel displays may achieve color intensity by altering timing information to individual sub-pixels to achieve different levels of color and perceived brightness using the persistence of vision phenomenon. Flat panel clock and control signals may comprise five bits of timing data as is known in the art to control application of flat panel data accordingly.

A/D converter and flat panel display controller 280 may optionally include power management block 420 and suspend/standby timer 430. Such power management features may be useful in portable computers to conserve battery power and may also be useful in desktop applications to reduced overall power consumption in a computer. Power management block 420 and suspend/standby timer 430 may be coupled to each of blocks 410, 450, 550, and 460 within A/D converter and flat panel display controller 280. Suspend input signals may instruct power management block 420 to commence shutdown of selected components within A/D converter and flat panel display controller 280 as well as flat panel display 260 itself.

Signal ACTI, indicative of activity within the overall computer system, may reset suspend/standby timer 430 when activity is detected. If no activity is detected, suspend/stand by timer 430 may also commence shutdown of selected components within A/D converter and flat panel display controller 280 as well as flat panel display 260.

As noted above, a flat panel display may be provided with a high-voltage power $V_{EE}$ and flat panel logic power $V_{DD}$. If $V_{EE}$ is applied to an FPD without $V_{DD}$, the flat panel display may be damaged. Such damage is unlikely in general use. However, particularly in testing, it may occur that one or more clock or control signals may be "stuck", resulting in improper shutdown of flat panel display 260 and resultant damage. Co-pending U.S. application Ser. No. 08/704,842, filed Aug. 28, 1996, entitled "METHOD AND APPARATUS FOR PROVIDING LCD PANEL PROTECTION IN AN LCD DISPLAY CONTROLLER", incorporated herein by reference, describes a display controller for a flat panel display with a circuit for protecting a flat panel display from damage.

Figure 5:
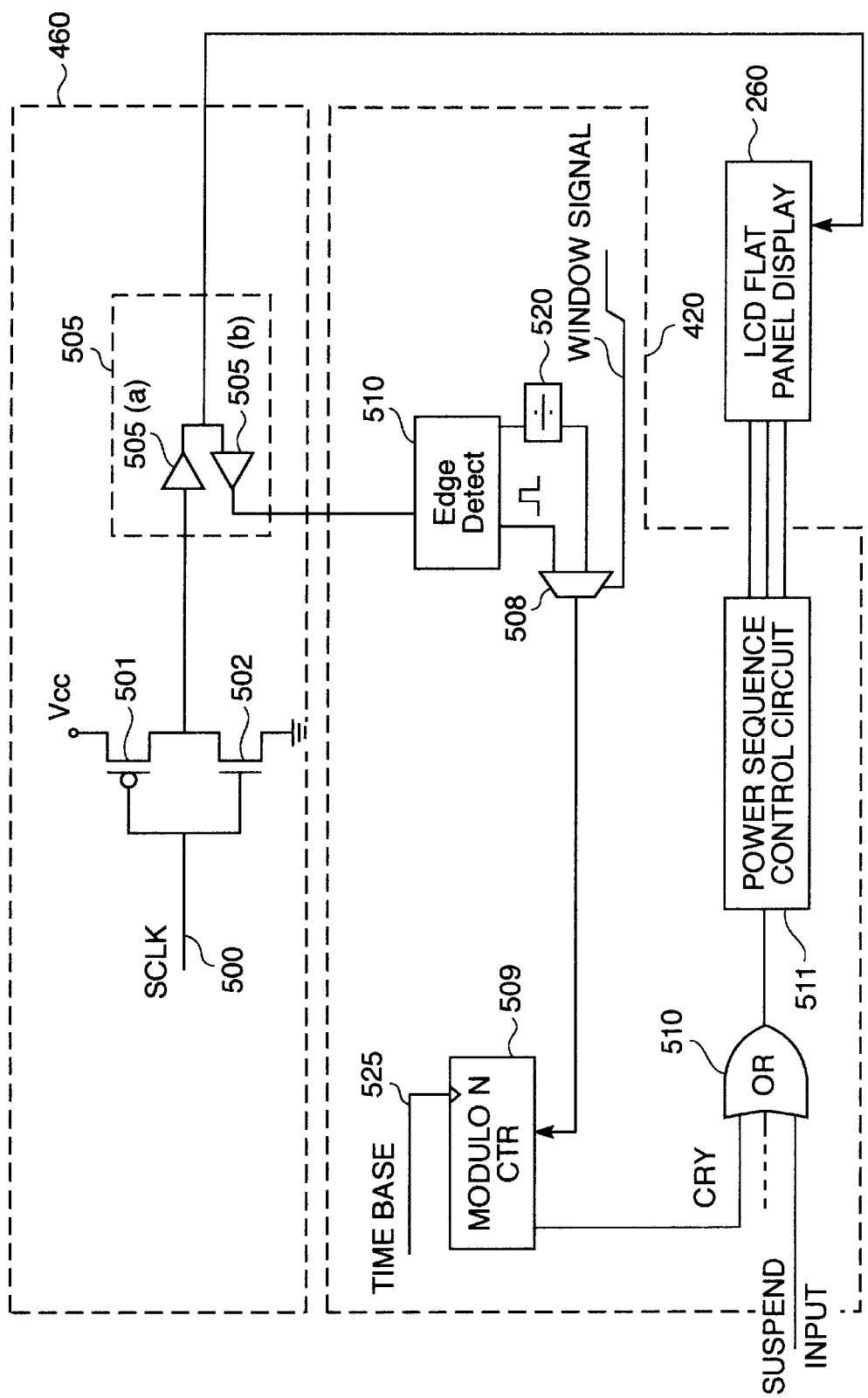
FIG. 5 is a block diagram of a flat panel protection circuit which may be incorporated into A/D converter and flat panel controller 280 of FIG. 4.

A/D converter and flat panel controller 280 may be provided with such a circuit as illustrated in FIG. 5. As illustrated in FIG. 5, A/D converter and flat panel controller 280 may include a signal line 500 which in turn may be provided with a pad driver comprising complimentary MOS (CMOS) transistors 501 and 502, as is known in the art.

For the purposes of illustration, signal line 500 is shown as representing signal line SCLK. However, similar circuitry may also be provided to monitor any of the LLCLK, or LFS clock signal lines as well. It will be appreciated by one of ordinary skill in the art that the elements illustrated in FIG. 5 may be replicated for all three signal lines (SCLK, LLCLK, and LFS) if required.

The output of the output pad driver comprising CMOS transistors 501 and 502 may be fed to contact pad 505 which in turn may be coupled to an LCD flat panel display as is known in the art. Contact pad 505 may comprise an I/O pad, as indicated by the presence of input pad driver 505(b). Such I/O pad drivers are known in the art for other signal and data line applications within integrated circuits. Thus the design and implementation of such an I/O pad is well known to those of ordinary skill in the art and may be readily implemented within an integrated circuit design.

However, in most applications of an I/O pad, an input signal is expected through the pad from an external device, and thus the requirement for both input and output pad drivers. In the present invention, however, input pad driver 505(b) is applied to feed back the output signal of signal line 500 to circuitry within A/D converter and flat panel display controller 280.

The output of input pad driver 505(b) may comprise whatever clock signal is to be driven over signal line 500, in this example, pixel timing signal SCLK.

In FIG. 5, output driver 505 is illustrated as two drivers 505(*a*) and 505(*b*) comprising input and output signal drivers of A/D flat panel interface 460. Output driver 505(*a*) outputs a clock signal to flat panel display 260. A corresponding input driver 505(*b*), coupled to output driver 505(*a*), feeds back the clock signal to power management block 420. Within power management block 420, edge detecting circuit 510, coupled to input driver 505(*b*), detects edge transitions in the clock signal and outputs a pulse when an edge transition is detected.

The output of edge detecting circuit 510 is fed to MUX 508 which is driven by a window signal to MUX the output of edge detecting circuit 510 with a divided value of the edge detection circuit produced by divider 520 in order to compensate for horizontal and vertical retrace periods. The output of MUX 508 resets a counter which is clocked by independent time base 525. If counter 508 overflows, a carry signal CRY is output to flat panel power control sequence circuit 511 through OR gate 510 to shut down power to flat panel display 260 before damage occurs.

As noted above, such damage scenarios may be largely limited to situations in which a new flat panel display controller design is to be tested. However, it is not inconceivable that such damage could occur in regular use, particularly if a flat panel display controller and/or software is not carefully designed. Such damage could lead to considerable liability for a computer manufacturer, display manufacturer, or component supplier. Given the transient nature of such damage scenarios, it may be difficult to determine conclusively whether panel failure is due to faulty panel design, controller design, or software failure.

Thus, it may be desirable to provide a stand-alone flat panel display protection device which may be incorporated into a flat panel controller device, portable computer, or flat panel display. A flat panel display manufacturer may incorporate such a device into its display to shut down the display when an improper combination of voltage levels is detected or a particular clocking signal appears stuck or the like.

Figure 6:
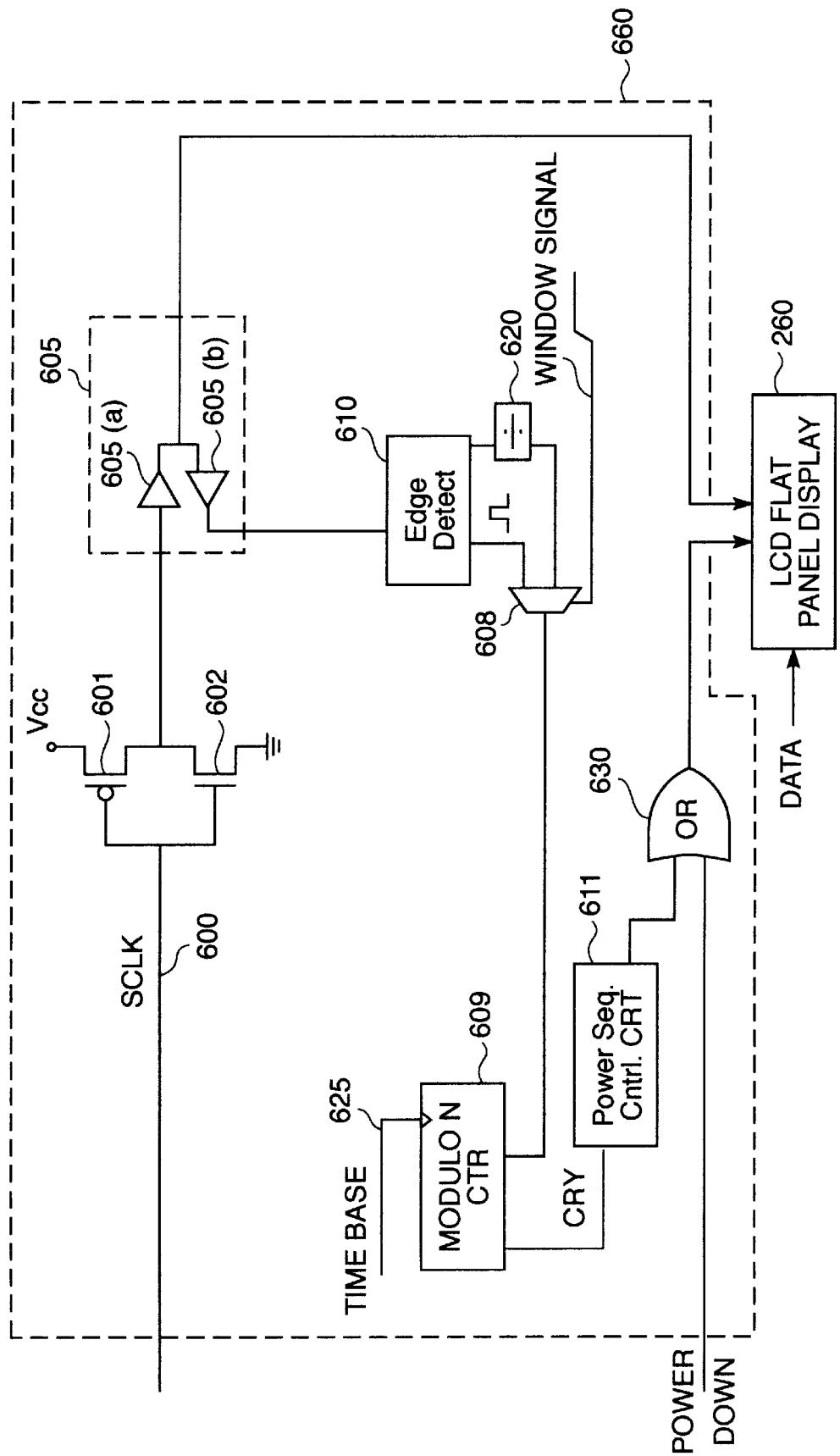
FIG. 6 is a block diagram of a stand-alone flat panel protection circuit.

FIG. 6 is a block diagram of stand-alone flat panel display protection device 660. Again, for purposes of illustration, circuitry is shown for only one flat panel clock signal, SCLK. However, one of ordinary skill in the art may appreciate that such circuitry may be replicated for other clock signals such as LFS, LLCLK, or the like.

Signal line 600 may receive signal SCLK from a flat panel display controller or the like and feed such a signal to an output pad driver comprising CMOS transistors 601 and 602. Such an output pad driver may in turn drive signal SCLK to contact pad output driver 605 which in turn may be coupled to LCD flat panel display 260.

Output driver 605 is illustrated as two drivers 605(*a*) and 605(*b*) comprising input and output signal drivers of stand-alone flat panel display protection device 660. Output driver 605(*a*) outputs a clock signal to flat panel display 260. A corresponding input driver 605(*b*), coupled to output driver 605(*a*), feeds back the clock signal to stand-alone flat panel display protection device 660.

Within stand-alone flat panel display protection device 660, edge detecting circuit 610, coupled to input driver 605(*b*), detects edge transitions in the clock signal and outputs a pulse when an edge transition is detected. The output of edge detecting circuit 610 is fed to MUX 608 which is driven by a window signal to MUX the output of edge detecting circuit 610 with a divided value of the edge detection circuit produced by divider 620 in order to compensate for horizontal and vertical retrace periods.

The window signal may be generated by field timing LFS and/or line clock signal LLCLK. As may be appreciated by one of ordinary skill in the art, pixel timing signal SCLK may be interrupted between adjacent lines or fields, and thus some mechanism must be put into place to insure that such interruptions are not confused with a "stuck" SCLK signal. Thus, during horizonal and vertical intervals, MUX 608 may be switched to insure that Modulo N counter 609 is properly reset.

The output of MUX 608 resets counter 608 which is clocked by independent time base 625. If counter 608 overflows, a carry signal CRY is output to flat panel power control sequence circuit 611 through OR gate 610 to shut down power to flat panel display 260 before damage occurs. OR gate 610 may OR internally driven shutdown signals with POWERDOWN signals generated by control circuitry from a flat panel display controller (e.g., for energy saving purposes).

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A device for protecting a digital display device from damage, comprising:
    input means for receiving digital display timing control signals; and
    means for monitoring a selected one of the digital display timing control signals and for shutting down power to the digital display device if the selected one of the digital display timing control signals becomes inactive,
    wherein said means for monitoring further comprises:
        an output driver for outputting the selected one of the digital timing control signals to the digital display device;
        an input driver, coupled to said output driver, for feeding back the selected one of the digital timing control signals to the means for monitoring;
        a counter having a reset input coupled to a said input driver, for counting an independently generated clock signal and outputting a carry signal when a predetermined count is reached; and
        a digital display device power control sequence circuit, coupled to said counter, for receiving the carry signal and shutting off power to the digital display device in response to the carry signal.

2. The device of claim 1, wherein said counter further comprises an enable input coupled to a display enable signal, for enabling and disabling said counter in response to the display enable signal such that said counter is disabled during vertical and horizontal retrace intervals.

3. The device of claim 2, wherein said independently generated clock signal comprises an external oscillator.

4. The device of claim 2 wherein the clock signal comprises a pixel clock signal and the independently generated clock signal comprises a 3 to 14 Mhz external clock.

5. The device of claim 2 wherein the clock signal comprises a line clock signal and the independently generated clock signal comprises 32 Khz clock signal.

6. The device of claim 2 wherein the clock signal comprises a field timing signal and the independently generated clock signal comprises a line clock signal.

7. The device of claim 2, further comprising:
    an edge detector, coupled to the input driver, for detecting an edge transition of a signal from the input driver and outputting a signal upon detection of such an edge transition to the reset input of said counter.

8. The device of claim 7, further comprising:

a MUX, coupled to said edge detector and said counter, for MUXing the signal from the edge detector with a divided signal from the edge detector, said MUX being switched by a window signal indicating the presence of a retrace period.

* * * * *